United States Patent [19]

Engdahl

[11] Patent Number: 4,735,641

[45] Date of Patent: Apr. 5, 1988

[54] APPARATUS AND METHOD OF PRODUCING REFRIGERATION AS ICE AT THE TRIPLE POINT OF WATER

[75] Inventor: Gerald E. Engdahl, Wheaton, Ill.

[73] Assignee: CBI Research Corporation, Palatine, Ill.

[21] Appl. No.: 26,022

[22] Filed: Mar. 16, 1987

[51] Int. Cl.$^4$ ............................................. B01D 9/04
[52] U.S. Cl. ........................................ 62/532; 62/123
[58] Field of Search ................................. 62/123, 532

[56] References Cited

U.S. PATENT DOCUMENTS

| | | | |
|---|---|---|---|
| 3,342,039 | 9/1967 | Bridge et al. | 62/123 |
| 4,003,213 | 1/1977 | Cox | 62/324.3 |
| 4,081,257 | 3/1968 | Lassmann | 62/532 |
| 4,474,031 | 10/1984 | Collet | 62/324.3 |

*Primary Examiner*—Ronald C. Capossela
*Attorney, Agent, or Firm*—Marshall, O'Toole, Gerstein, Murray & Bicknell

[57] ABSTRACT

Ice is produced by supplying a cold antifreeze solution into a freezer vessel evacuated to operate at the triple point of water; feeding a stream of water into the vessel whereby (A) part of the water flashes into water vapor which extracts its latent heat of vaporization from the water in the freezer and part of the water is cooled and converted to ice crystals in a pool of water therein and (B) the water vapor is condensed by and absorbed into the cold antifreeze solution thereby forming a more dilute antifreeze solution; removing a mixture of ice crystals and water from the vessel; withdrawing dilute antifreeze solution from the vessel and subjecting the solution to a water separating treatment to separate water and form concentrated antifreeze, combining the concentrated antifreeze with antifreeze solution withdrawn from the vessel to form a combined antifreeze stream; cooling the combined antifreeze stream to produce a cold antifreeze stream; and recycling the cold antifreeze stream to the freezer vessel.

27 Claims, 2 Drawing Sheets

APPARATUS AND METHOD OF PRODUCING REFRIGERATION AS ICE AT THE TRIPLE POINT OF WATER

This invention relates to apparatus and methods of producing refrigeration in the form of ice, especially an aqueous slurry of ice crystals, at the triple point of water.

BACKGROUND OF THE INVENTION

Ice has been produced and used for many years for cooling and refrigeration purposes, such as air conditioning, food processing and preservation and in many industrial processes and operations. The ice produced for such purposes is often in block or similar large forms, or in the form of an aqueous slurry containing ice crystals.

Cox U.S. Pat. No. 4,003,213 discloses apparatus and methods for producing an aqueous ice slurry by utilization of the triple point of water. The triple point of water is the pressure at which ice, water and vapor are in equilibrium. This pressure has been determined to be about 4.6 millimeters of mercury absolute pressure.

According to the Cox U.S. Pat. No. 4,003,213, water is fed into a vessel having a pressure slightly below the water triple point pressure. Vapor formed in the vessel is continuously removed as it is formed. The continuous removal of water vapor from the interior of the vessel upsets the equilibrium which is restored by the vaporization of additional feed water. The heat required for vaporization is extracted from the water itself but as the water is already at its freezing point the removal of vapor also causes a remaining portion of the water to freeze. Thus, water is continuously and simultaneously boiling and freezing within the vessel. The heat liberated by the freezing of the ice is equal to 144 BTU per pound of ice, the heat of crystallization of water, formed which is extracted by the vapor formed in the simultaneous boiling process. The thermal energy content of the vapor is higher than that of ice and equals about 1073 BTU per pound of vapor. The ice crystals formed in the vessel are removed with water as a slurry mixture.

The vapor produced in the vessel is condensed, in one embodiment, in an antifreeze solution chilled by an evaporator coil external of the vessel. The antifreeze solution becomes diluted and is reconcentrated by passage over a hot condensing coil causing dissolved water to be evaporated. It is considered undesirable, however, to remove the vapor and condense it external of the vessel and to also reconcentrate the diluted antifreeze solution by evaporation. The evaporation process requires the addition of considerable energy. This (Cox) process for producing ice has a low coefficient of performance.

SUMMARY OF THE INVENTION

According to one aspect of the invention an energy efficient method of producing ice is provided comprising supplying a cold antifreeze solution into a section of a freezer vessel, evacuated to operate at the triple point of water, where the cold antifreeze solution can contact water vapor therein and be collected without significant intermixing with any separate water pool in the freezer vessel; feeding a stream of water into the freezer vessel whereby (A) part of the water flashes into water vapor which extracts its latent heat of vaporization from the water in the freezer and part of the water is cooled and converted to ice crystals in a pool of water therein and (B) the water vapor is condensed by and absorbed into the cold antifreeze solution thereby forming a dilute antifreeze solution; removing a mixture of ice crystals and water from the freezer vessel; withdrawing dilute antifreeze solution from the freezer vessel and subjecting at least part of the solution to a water separating treatment to produce essentially water and a concentrated antifreeze stream; combining the concentrated antifreeze stream with antifreeze solution withdrawn from the freezer vessel to form a combined antifreeze stream; cooling the combined antifreeze stream to produce a cold antifreeze stream; and recycling the cold antifreeze stream to the freezer vessel.

By condensing the vapor in the freezer vessel by contact with the cold antifreeze solution a more efficient simpler system is achieved than by removing the vapors and condensing them externally. Concentration of the diluted antifreeze solution can be effected by a membrane or by use of a freeze exchanger. By use of a water separating membrane means or a freeze exchanger, concentration of the diluted antifreeze solution is effected by much less energy than by evaporative concentration.

Non-condensible gases can be removed from the freezer vessel, and any entrained water vapor can be condensed to water and the water returned to the freezer vessel.

The degassed water can be cooled, before being fed to the freezer vessel, by indirect heat exchange with at least part of the dilute antifreeze solution removed from the freezer vessel before the said part of the dilute antifreeze solution is subjected to the water separating membrane treatment. This increases efficiency by utilizing available cooling capacity.

The cold antifreeze solution can be produced by indirectly contacting the antifreeze solution, while it is at a warmer temperature, with a cold refrigerant in a closed loop refrigeration system.

The water separating membrane treatment can take several forms but is intended to include a reverse osmosis membrane treatment or an electrodialysis membrane treatment.

According to a second aspect of the invention apparatus is provided comprising a freezer vessel adapted to operate at a vacuum at the triple point of water; means to provide cold aqueous antifreeze solution in the freezer vessel in direct contact with water vapor formed therein; means to feed water into the freezer vessel wherein (A) part of the water flashes into water vapor which extracts its latent heat of vaporization from the water in the freezer and part of the water is cooled and converted to ice crystals in a pool of potable water therein and (B) the water vapor is condensed by and absorbed into cold antifreeze solution therein; means to collect the antifreeze solution containing condensed and absorbed water vapor in the freezer vessel so as to keep it from mixing with the pool of water; means to remove a mixture of ice crystals and water from the freezer vessel and feed the mixture to a drainer; means to withdraw separated water from the drainer; means to withdraw a slurry of ice crystals and water from the drainer; a water separating means; means to remove the antifreeze solution containing absorbed water from the freezer vessel and feed it to the water separating means in which excess water is removed from the aqueous antifreeze solution and the antifreeze solution is concentrated; means to remove the separated excess water from the separating means; and means to withdraw the concentrated antifreeze solution from the separating means and return it to the freezer vessel.

The separating means used in the apparatus can be a freeze exchanger, a reverse osmosis membrane means, an electrodialysis membrane means or some other suitable water separating membrane means.

The apparatus can include conduit means communicating with the interior of the freezer vessel, a blower, and a vapor condenser, and conduit means communicating with the vapor condenser and a vacuum pump. Means to return the water separated from the drainer to the freezer vessel is desirably provided as well as means to return the separated excess water from the water separating membrane means to the freezer vessel.

The apparatus can furthermore include an exchanger in the interior of the freezer vessel; means to feed a refrigerant through the exchanger for cooling; and means for directing the aqueous antifreeze solution into contact with the exchanger to indirectly cool it before it is removed from the freezer vessel.

Aqueous antifreeze solutions useful in the method and apparatus of the invention includes an aqueous solution of an inorganic salt or an aqueous glycol or alcohol solution. Other suitable antifreeze solutions can also be used.

DETAILED DESCRIPTION OF THE DRAWINGS

To the extent it is reasonable and practical the same or similar elements in the various views of the drawings will be identified by the same numbers.

Figure 1:
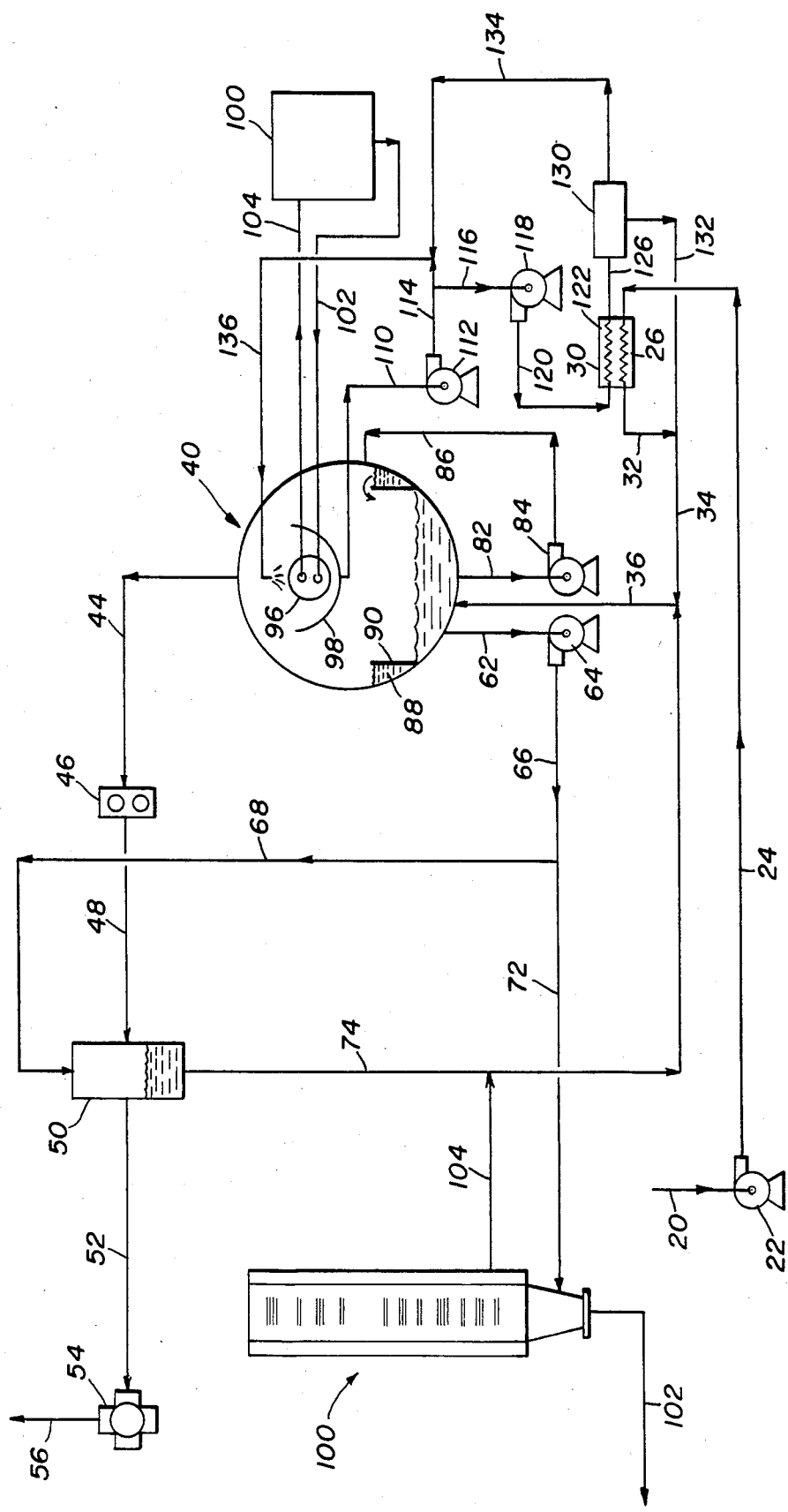
FIG. 1 constitutes a schematic representation of apparatus provided by the invention and useful in practicing the method of the invention.

With reference to FIG. 1, conduit 20 supplies water from a suitable source to pump 22 from which the water is fed at increased pressure to conduit 24 which feeds it to coil 26 in heat exchanger 30. The feed stream, indirectly cooled in heat exchanger 30, is removed therefrom by conduit 32 which delivers it to conduit 34 which feeds it to conduit 36. Conduit 36 then feeds the water to the lower part of freezer vessel 40.

The interior of freezer vessel 40 is maintained at a vacuum adequate to yield conditions suitable for reaching the triple point of water. Non-condensibles and some water vapor are removed through conduit 44 which communicates with the interior of freezer vessel 40 and with blower 46. Non-condensible gases and water vapor are then fed by blower 46 to conduit 48 which delivers them to interstage condenser 50. Most of the water vapor is condensed in condenser 50 by direct contact with a cold mixture of ice crystals and water supplied to the condenser by conduit 68. Non-condensible gases and water vapor are withdrawn from condenser 50 by conduit 52 which is in communication with vacuum pump 54. The gases from vacuum pump 54 are fed to conduit 56 and discharged from it to the atmosphere.

A mixture of ice crystals and water is withdrawn from freezer vessel 40 by conduit 62 which communicates with pump 64. The ice-water mixture is discharged from pump 64 into conduit 66 which feeds part of it to conduit 68 and part to conduit 72. As described above, the conduit 68 delivers the mixture of ice and water to condenser 50 where it serves to condense water vapor. The water and condensed water vapor, plus some ice crystals, are removed from condenser 50 by conduit 74 and delivered to conduit 36 to be returned to freezer vessel 40.

To provide additional mass transfer area in the lower part of freezer vessel 40, the apparatus is desirably provided with a liquid stream withdrawal conduit 82 which communicates with a pump 84 from which the liquid is discharged to conduit 86. Conduit 86 delivers the liquid to a well space 88 formed by a vertical plate 90 connected at its bottom edge to the surface of freezer vessel 40. The plate 90 functions as a weir over which the liquid flows into the pool space at the bottom of the vessel.

The mixture of ice and water fed to conduit 72 is delivered to drainer 100 in which much of the water is separated from the ice, thereby forming a slurry which is withdrawn by conduit 102 and used for any suitable purpose. The water separated in drainer 100 is withdrawn therefrom by conduit 104 and delivered to conduit 74 to be returned to freezer vessel 40.

A cooling coil 96 is mounted in the upper central portion of freezer vessel 40 above a dished collector plate 98 into which dilute antifreeze solution flows. Cooling coil 96 is supplied with a cold refrigerant by conduit 102 from a conventional closed loop refrigeration system 100. Refrigerant vapor and liquid is withdrawn from coil 96 by conduit 104. The vapor will be reliquefied and recycled to conduit 102.

Dilute antifreeze solution which collects in dished shell 98 is withdrawn by conduit 110 and fed to pump 112 which delivers it to conduit 114 which feeds at least part of the dilute antifreeze to conduit 116. Conduit 116 delivers the dilute antifreeze to pump 118 from which it is delivered to conduit 120 which feeds it to coil 122 in exchanger 30. Since the dilute antifreeze is cold it cools the incoming potable water flowing through coil 26 in exchanger 30.

The now warmed dilute antifreeze is delivered from coil 122 to conduit 126 which feeds it to water separating membrane unit means 130 which, for example, can be a water separating reverse osmosis or electrodialysis membrane means. Water separated by the membrane unit means 130 is removed therefrom by conduit 132 and fed to conduit 34 for delivery to conduit 36 to return the water to freezer vessel 40.

By removal of water in the water separating membrane unit means 130 the antifreeze solution is concentrated. The concentrated but warm antifreeze solution is withdrawn from water separating membrane means 130 by conduit 134 and fed at a constant concentration to conduit 136. Conduit 136 terminates inside of freezer vessel 40 above coil 96. The antifreeze is sprayed from the end of conduit 136 over coil 96 thereby cooling the antifreeze solution to a temperature low enough to condense the water vapor in freezer vessel 40. Condensing the water vapor is the primary means of maintaining the vacuum in the freezer vessel. The condensed water vapor dilutes the antifreeze solution which collects in dished shell 98 as described previously.

As indicated above not all of the dilute antifreeze need be delivered by conduit 114 to conduit 116. Part of the antifreeze solution can be delivered by conduit 114 to conduit 136 to adjust the concentration and/or temperature of the antifreeze solution fed by conduit 136 into the freezer vessel 40.

Figure 2:
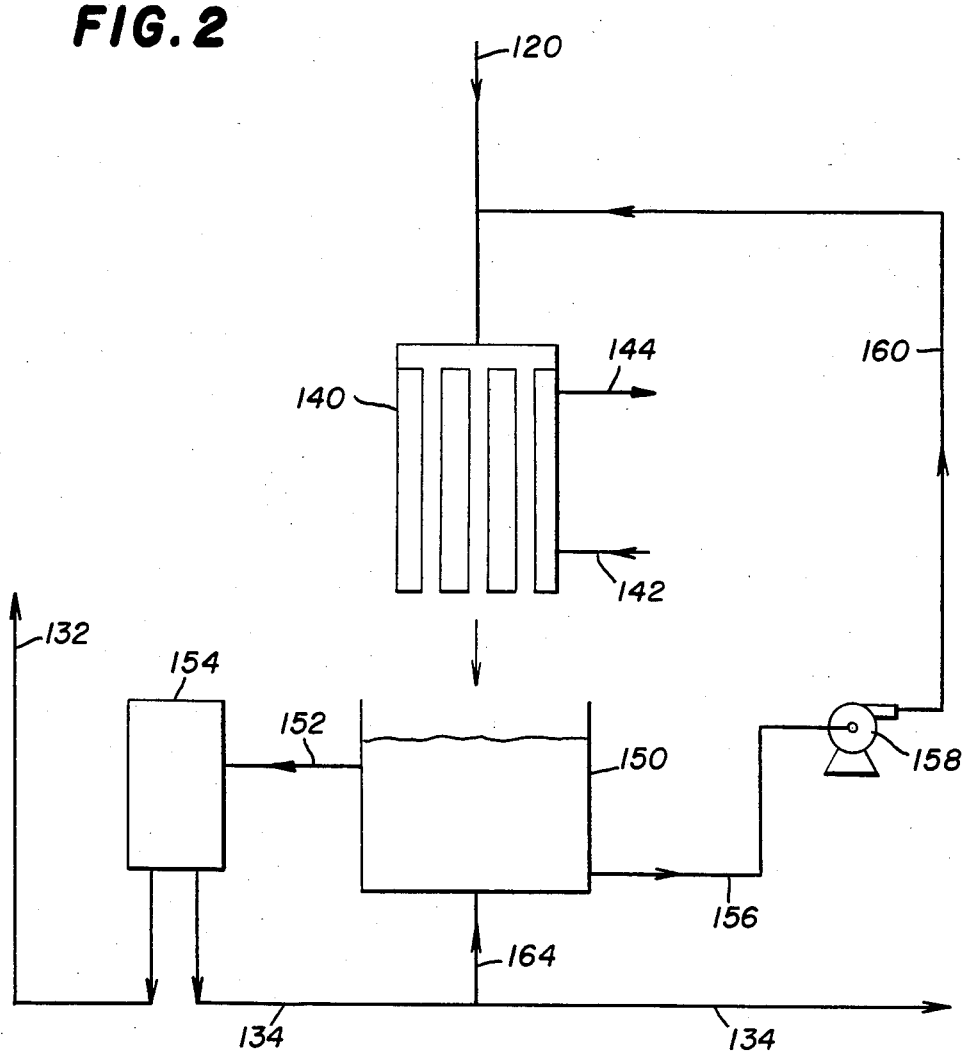
FIG. 2 shows in schematic form a second embodiment of the invention.

The second embodiment of the invention utilizes an indirect freeze system instead of a reverse osmosis system. With reference to FIG. 2 the dilute antifreeze is fed from conduit 120 to the tube side of indirect freeze exchanger 140 of the type disclosed in Schoerner U.S. Pat. No. 4,452,302, the entire contents of which is incorporated herein by reference. The shell side of freeze exchanger 140 is supplied with a liquefied refrigerant by conduit 142 and refrigerant vapor is removed by conduit 144 and recycled in a conventional closed loop refrigeration cycle.

As the dilute antifreeze flows down the inside of the tubes in freeze exchanger 140 the liquid is cooled and a portion of the water is converted to ice crystals. The resulting slurry of ice crystals and antifreeze flows to receiver 150. Some of the solution in receiver 150 is withdrawn by conduit 156 and fed to pump 158 which delivers it to conduit 160 which recirculates it to freeze exchanger 140 to increase the ice fraction in receiver 150. The slurry is withdrawn from receiver 150 through conduit 152 and fed to wash column-melter 154 in which the ice is separated from the slurry, washed and converted to water. The water is withdrawn from wash column-melter 154 by conduit 132 and recycled in the system as described in conjunction with FIG. 1. The water or brine is removed from wash column-melter 154 by conduit 134 and is also recycled as shown in FIG. 1. A portion of the flow from conduit 134 can be fed to conduit 164 to be recycled back to receiver 150.

EXAMPLE

Feed water is supplied by conduit 20 at 3.5 liters/sec at 20.5° C. The pressure in freezer vessel 40 is maintained at about 4.3 millimeters of mercury absolute pressure. Calcium chloride solution is used as the antifreeze solution.

An ice slurry flow in conduit 102 of about 6 liters/sec with an ice fraction of 60% will be obtained.

The foregoing detailed description has been given for clearness of understanding only, and no unnecessary limitations should be understood therefrom, as modifications will be obvious to those skilled in the art.

What is claimed is:

1. A method of producing ice comprising:
supplying a cold antifreeze solution into a section of a freezer vessel, evacuated to a vacuum to operate at the triple point of water, where the cold antifreeze solution can contact water vapor therein and be collected without significant intermixing with any separate water pool in the freezer vessel;
feeding a stream of water into the freezer vessel whereby (A) part of the water flashes into water vapor which extracts its latent heat of vaporization from the water in the freezer and part of the water is cooled and converted to ice crystals in a pool of water therein and (B) the water vapor is condensed by and absorbed into the cold antifreeze solution thereby forming a more dilute antifreeze solution;
removing a mixture of ice crystals and water from the freezer vessel;
withdrawing dilute antifreeze solution from the freezer vessel and subjecting at least part of the solution to a water separating treatment to separate water from the dilute solution and form a concentrated antifreeze stream;
combining the concentrated antifreeze stream with antifreeze solution withdrawn from the freezer vessel to form a combined antifreeze stream;
cooling the combined antifreeze stream to produce a cold antifreeze stream; and
recycling the cold antifreeze stream to the freezer vessel.

2. A method according to claim 1 in which non-condensibles and water vapor are removed from the freezer vessel.

3. A method according to claim 2 in which a mixture of water and ice crystals is removed from the freezer vessel and used to condense the water vapor removed from the freezer vessel.

4. A method according to claim 1 in which incoming water is cooled, before being fed to the freezer vessel, by indirect heat exchange with at least part of the dilute antifreeze solution removed from the freezer vessel before the said part of the dilute antifreeze solution is subjected to the water separating treatment.

5. A method according to claim 1 in which the cold antifreeze solution is cooled by spraying the solution over a cold tube bundle in the freezer.

6. A method according to claim 1 in which the water separating treatment is effected by means of a membrane.

7. A method according to claim 6 in which the water separating membrane treatment is a reverse osmosis membrane treatment.

8. A method according to claim 6 in which the water separating membrane treatment is an electrodialysis membrane treatment.

9. A method according to claim 1 in which the water separating treatment is effected by cooling the solution to form ice crystals and the ice crystals are then separated from the solution.

10. A method according to claim 1 in which the stream of water is degassed before entering the freezer vessel.

11. A method according to claim 1 in which the stream of water is cooled before entering the freezer vessel.

12. A method according to claim 1 in which the aqueous antifreeze solution is an aqueous solution of an alkali metal chloride or alkaline earth metal chloride.

13. A method according to claim 1 in which the aqueous antifreeze solution is an aqueous glycol solution or an alcohol solution.

14. A method according to claim 1 in which the water separating treatment is effected by means of a membrane.

15. A method of producing ice comprising:
supplying a cold antifreeze solution into a section of a freezer vessel, evacuated to a vacuum to operate at the triple point of water, where the cold antifreeze solution can contact water vapor therein and be collected without significant intermixing with any separate water pool in the freezer vessel;
feeding a stream of water into the freezer vessel whereby (A) part of the water flashes into water vapor which extracts its latent heat of vaporization from the water in the freezer and part of the water is cooled and converted to ice crystals in a pool of water therein and (B) the water vapor is condensed by and absorbed into the cold antifreeze solution thereby forming a more dilute antifreeze solution;
removing a mixture of ice crystals and water from the freezer vessel;

withdrawing dilute antifreeze solution from the freezer vessel and subjecting at least part of the solution to a water separating membrane treatment to produce a membrane permeate comprising water and a concentrated antifreeze stream;

feeding the water permeate to the freezer vessel;

combining the concentrated antifreeze stream with antifreeze solution withdrawn from the freezer vessel to form a combined antifreeze stream;

cooling the combined antifreeze stream to produce a cold antifreeze stream; and recycling the cold antifreeze stream to the freezer vessel.

16. A method according to claim 15 in which uncondensed water vapor is removed from the freezer vessel, condensed to liquid and the liquid is returned to the freezer vessel.

17. A method according to claim 15 in which the water is cooled, before being fed to the freezer vessel, by indirect heat exchange with at least part of the dilute antifreeze solution removed from the freezer vessel before the said part of the dilute antifreeze solution is subjected to the water separating membrane treatment.

18. A method according to claim 16 in which a mixture of water and ice crystals is removed from the freezer vessel and used to condense the water vapor removed from the freezer vessel.

19. A method according to claim 15 in which the cold antifreeze solution is produced by indirectly contacting the antifreeze solution with a cold refrigerant in a closed loop refrigeration system.

20. Apparatus comprising:

a freezer vessel adapted to operate at a vacuum at the triple point of water;

means to provide cold aqueous antifreeze solution in the freezer vessel in direct contact with water vapor formed therein;

means to feed water into the freezer vessel wherein (A) part of the water flashes into water vapor which extracts its latent heat of vaporization from the water in the freezer and part of the water is cooled and converted to ice crystals in a pool of water therein and (B) the water vapor is condensed by and absorbed into cold antifreeze solution therein;

means to collect the antifreeze solution containing condensed and absorbed water vapor in the freezer vessel so as to keep it from mixing with the pool of water;

means to remove a mixture of ice crystals and water from the freezer vessel and feed the mixture to a drainer;

means to withdraw separated water from the drainer;

means to withdraw a slurry of ice crystals and water from the drainer;

a water separating means;

means to remove the antifreeze solution containing absorbed water from the freezer vessel and feed it to the water separating means in which excess water is removed from the aqueous antifreeze solution and the antifreeze solution is concentrated;

means to remove the separated excess water from the water separating means; and means to withdraw the concentrated antifreeze solution from the water separating means and return it to the freezer vessel.

21. Apparatus according to claim 20 in which the water separating means is a membrane means.

22. Apparatus according to claim 21 including means to return the separated excess water from the separating membrane means to the freezer vessel.

23. Apparatus according to claim 20 in which the water separating means is an indirect freeze system.

24. Apparatus according to claim 20 in which the separating membrane means is an electrodialysis membrane means.

25. Apparatus according to claim 20 including:

conduit means communicating with the interior of the freezer vessel and a vapor condenser; and conduit means communicating with the vapor condenser and a vacuum pump.

26. Apparatus according to claim 20 including means to return the water separated from the drainer to the freezer vessel.

27. Apparatus according to claim 20 including:

an exchanger in the interior of the freezer vessel;

means to feed a refrigerant through the exchanger to cool it; and means directing the aqueous antifreeze solution into contact with the exchanger to indirectly cool it before it is removed from the freezer vessel

* * * * *

UNITED STATES PATENT AND TRADEMARK OFFICE
CERTIFICATE OF CORRECTION

PATENT NO. : 4,735,641

DATED : April 5, 1988

INVENTOR(S) : Gerald Eugene Engdahl

It is certified that error appears in the above-identified patent and that said Letters Patent is hereby corrected as shown below:

In the cover sheet, box [73], change "Palatine" to -- Plainfield --; column 6, line 49, change "1" to -- 4 --.

Signed and Sealed this

Twenty-third Day of August, 1988

Attest:

DONALD J. QUIGG

Attesting Officer

Commissioner of Patents and Trademarks